G. H. JONES.
VALVE GEARING.
APPLICATION FILED MAR. 17, 1910.
986,175.
Patented Mar. 7, 1911.
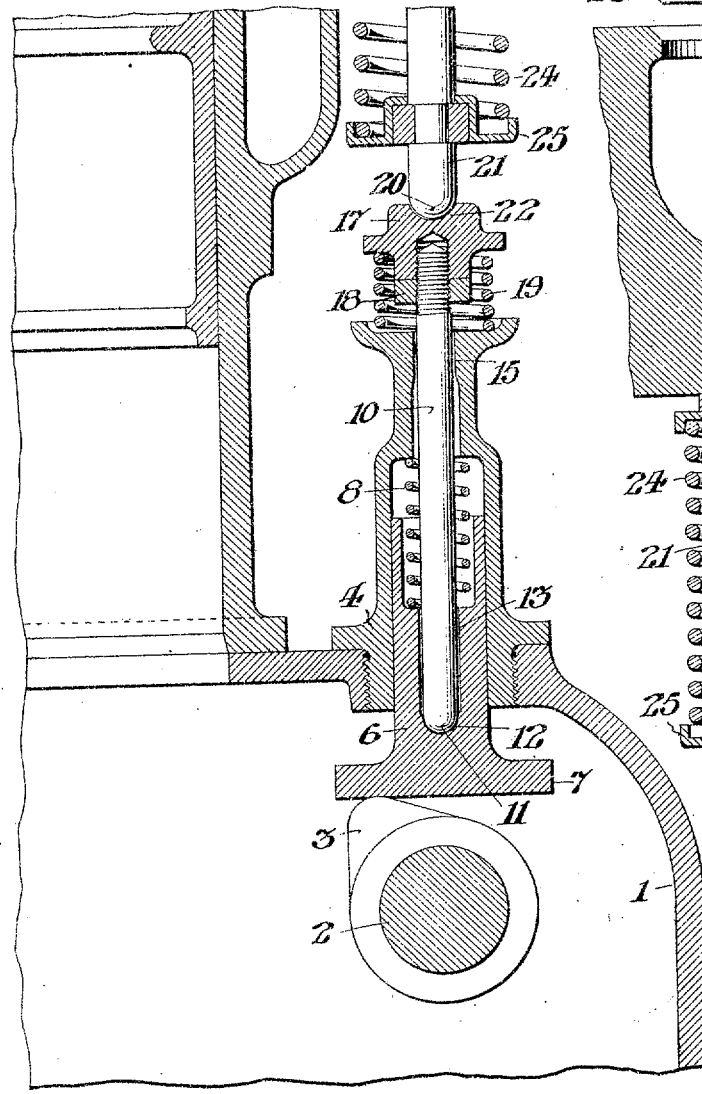
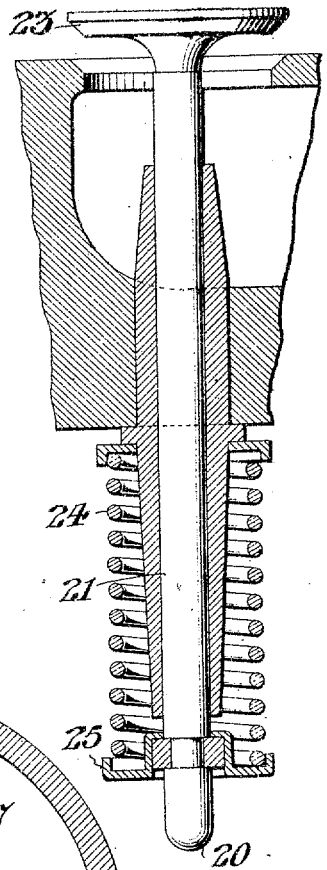
WITNESSES:
Philip W. Vessey.
Raymond Betts.
INVENTOR:
GEORGE HILL JONES,
by Arthur E. Paige
Atty.

UNITED STATES PATENT OFFICE.

GEORGE HILL JONES, OF ALDAN, PENNSYLVANIA.

VALVE-GEARING.

986,175. Specification of Letters Patent. Patented Mar. 7, 1911.

Application filed March 17, 1910. Serial No. 549,896.

*To all whom it may concern:*

Be it known that I, GEORGE HILL JONES, of Aldan, in the State of Pennsylvania, have invented a certain new and useful Improvement in Valve-Gearing, whereof the following is a specification, reference being had to the accompanying drawing.

My improvement is particularly applicable to a valve of the puppet type controlling the exhaust port of an internal combustion engine and operated by a rotary cam. As ordinarily constructed, the stem of such a valve is operatively connected with the cam by a push rod which being alternately picked up and dropped by the cam makes a clattering noise each time the valve is operated. Moreover, as the cam rotates and pushes said rod at right angles to its axis, it wears the rod bearings laterally, tilts the rod out of alinement with the valve stem and thus tilts the latter, causing the valve to wear its seat unevenly and leak.

Therefore, it is the object of my invention to provide a connecting medium between such a valve and cam, so constructed and arranged as to avoid the lost motion, noise and undue wear aforesaid.

As hereinafter described, my invention includes a connecting medium of adjustably variable length between said stem and cam, comprising a rod and a sleeve longitudinally adjustable thereon, and springs whereby said rod and sleeve are continuously maintained respectively in operative engagement with said stem and cam. Said sleeve receives the side thrust of the cam and the wear which is incident thereto, but does not transmit the same to the valve stem because the rod is universally pivotally connected with both said sleeve and stem.

My invention includes the various novel features of construction and arrangement hereinafter more definitely specified.

In the drawing:—Figure I is a fragmentary vertical sectional view of an internal combustion engine showing a convenient embodiment of my invention. Fig. II is a fragmentary sectional view of said engine showing the complete valve of which only a portion of the stem is shown in Fig. I.

In the drawing: 1 is the crank case of an internal combustion engine in which the shaft 2 is mounted to rotate carrying the cam 3 in opposition to the tubular bearing 4 supported by said case 1. The cylindrical sleeve 6 is mounted to reciprocate in said bearing 4 and has the circular head 7 continuously maintained in wiping contact with said cam by the spring 8 interposed between said sleeve and said bearing 4. The connecting rod 10 has its spherical lower end 11 universally pivotally fitted in the spherical seat 12 in said sleeve 6 at the bottom of the socket 13, the latter being larger than said rod 10 so as to permit it to oscillate to the desired extent, and, the upper portion 15 of the bearing 4 surrounding said rod being correspondingly larger than the latter. Said rod 10 is provided with the cap nut 17 which is longitudinally adjustable thereon and may be held in adjusted position by the jam nut 18. The spring 19 between said bearing 4 and said cap nut 17 maintains the latter continuously in operative engagement with the hemispherical end 20 of the valve stem 21, which is universally pivotally fitted in the spherical seat 22 in said nut 17. The valve 23 carried by said stem 21 is the exhaust valve of an internal combustion engine, is provided with the spring 24 which bears upon the collar 25 rigidly connected with said stem 21 and is capable of closing said valve upon its seat against the pressure of said spring 19. It is to be understood that by adjusting said cap nut 17 upon said rod 10 the extent of the opening movement of the valve may be precisely predetermined and, of course, such adjustment may be used to compensate for wear of the parts. Said sleeve 6 and connecting rod 10 being continuously maintained in spring contact respectively with said cam 3 and the valve stem 21, there is no lost motion between said parts and consequently there is no noise incident to the operation of the same, and, although there is lost motion between the lower end of said rod 10 and said sleeve because said rod is maintained against the valve stem 21 while the sleeve rises and falls idly in contact with the cam 3; such lost motion does not produce any noise, because the socket 13 is filled with oil from the crank case 1 which serves as a cushion between said rod and sleeve. Although said sleeve 6 receives the side thrust of the cam 3 it may be turned freely in said bearing 4 so that the tendency to unequal wear of the same is reduced to the minimum. However, if said sleeve 6 wears its bearing laterally so as to get out of axial alinement with the valve stem 22 the universal pivotal connections between said stem, rod and sleeve, will maintain the operative relation thereof, without tilting the valve.

It is to be understood that I do not desire to limit myself to the precise details of construction and arrangement above described, as it is obvious that various modifications may be made therein without departing from the essential features of my invention, as defined in the following claims.

I claim:—

1. The combination with the crank case of an internal combustion engine; of a tubular bearing supported by said case; a cam in said case arranged to rotate in opposition to said bearing; a cylindrical sleeve mounted to reciprocate in said bearing, having a head presented for contact with said cam; a spring interposed between said sleeve and said bearing pressing said sleeve against said cam; a valve rod pivotally fitted in a socket in said sleeve and having at its opposite end an adjustable cap nut; a jam nut for said cap nut; a spring between said bearing and said cap nut; a valve having a stem pivotally fitted to said cap nut; and a spring carried by said valve capable of closing the latter against the pressure of said cap nut spring.

2. The combination with a tubular bearing; of a cam arranged to rotate in opposition to said bearing; a cylindrical sleeve mounted to reciprocate in said bearing having a head presented for contact with said cam; a spring interposed between said sleeve and said bearing pressing said sleeve against said cam; a valve rod pivotally fitted in a socket in said sleeve and having at its opposite end an adjustable cap nut; a spring between said bearing and said cap nut; a valve having a stem pivotally fitted to said cap nut; and a spring capable of closing said valve against the pressure of said cap nut spring.

3. The combination with a tubular bearing; of a cam arranged to rotate in opposition to said bearing; a cylindrical sleeve mounted to reciprocate in said bearing having a head presented for contact with said cam; a spring interposed between said sleeve and said bearing pressing said sleeve against said cam; a valve rod pivotally fitted in a socket in said sleeve; a spring between said bearing and said valve rod; a valve having a stem pivotally fitted to said valve rod; and, a spring capable of closing said valve against the pressure of said other spring.

4. The combination with a tubular bearing; of a cam arranged to rotate in opposition to said bearing; a sleeve mounted to reciprocate in said bearing having a head presented for contact with said cam; a spring interposed between said sleeve and said bearing pressing said sleeve against said cam; a valve rod pivotally fitted in a socket in said sleeve; a spring between said bearing and said valve rod; a valve having a stem pivotally fitted to said valve rod; and, a spring capable of closing said valve against the pressure of said other spring.

5. The combination with a valve having a stem in rigid relation therewith; of a valve rod pivotally connected to said stem, arranged to oscillate on an axis transverse to the axis of said stem; a reciprocatory sleeve pivotally connected to said rod, so that the latter is arranged to oscillate on an axis transverse to the axis of said sleeve; resilient means pressing said stem and rod into contact with each other; and, resilient means tending to separate said rod and sleeve.

6. The combination with a valve having a stem in rigid relation therewith; of a valve rod pivotally connected to said stem, arranged to oscillate on an axis transverse to the axis of said stem; and, a reciprocatory sleeve pivotally connected to said rod, so that the latter is arranged to oscillate on an axis transverse to the axis of said sleeve.

7. The combination with an internal combustion engine valve; of a rotary cam arranged to operate said valve; and, means operatively connecting said valve and cam including a reciprocatory sleeve and a universal pivotal joint, arranged to permit oscillation on an axis transverse to the direction of the movement of said valve.

8. The combination with an internal combustion engine valve; of a rotary cam arranged to operate said valve; and, means operatively connecting said valve and cam including a reciprocatory sleeve open to the atmosphere and containing a liquid cushion.

In testimony whereof, I have hereunto signed my name at Philadelphia, Pennsylvania, this 24th day of February 1910.

GEORGE HILL JONES.

Witnesses:
 ARTHUR E. PAIGE,
 GERTRUDE N. R. MATTSON.